United States Patent [19]

Matsubara et al.

[11] 4,265,494

[45] May 5, 1981

[54] CRAWLER TRAVELLING APPARATUS

[75] Inventors: Yoshitaka Matsubara, Osaka; Shizuo Shimoie, Sakai; Takao Watanabe, Osaka; Yoshio Tomiyama, Sakai, all of Japan

[73] Assignee: Kubota, Ltd., Osaka, Japan

[21] Appl. No.: 22,267

[22] Filed: Mar. 20, 1979

[30] Foreign Application Priority Data

Apr. 4, 1978 [JP] Japan ............................ 53-44722[U]

[51] Int. Cl.³ .............................................. B60S 1/66
[52] U.S. Cl. .......................................... 305/12; 305/28
[58] Field of Search ...................... 305/11, 12, 15, 16, 305/24, 28, 57, 60

[56] References Cited

U.S. PATENT DOCUMENTS

| | | | |
|---|---|---|---|
| 2,418,610 | 4/1947 | Webb | 305/28 |
| 2,780,500 | 2/1957 | Lawson | 305/12 |
| 2,823,079 | 2/1958 | Williams | 305/28 |
| 4,006,940 | 2/1977 | Halterman, Jr. | 305/12 |
| 4,134,622 | 1/1979 | Krolak et al. | 305/12 |

FOREIGN PATENT DOCUMENTS 465049  8/1951  Italy ............................................ 305/12

*Primary Examiner*—Charles A. Marmor
*Attorney, Agent, or Firm*—Haseltine and Lake

[57] ABSTRACT

Crawler travelling apparatus in which a crawler having crawler links is windingly laid over the driving wheel and the take-up wheel, guide wheels are disposed at the frame for guiding the lower travel portion of the crawler, and the lateral outer portions of the guide wheels are covered by an earth and sand protection cover. Further disposed at the frame is an auxiliary cover so as to form an earth and sand discharging opening together with the first-mentioned cover.

7 Claims, 4 Drawing Figures

CRAWLER TRAVELLING APPARATUS

BACKGROUND OF THE INVENTION

The present invention relates to a crawler travelling apparatus in which a crawler having crawler links is windingly laid over the driving wheel and the take-up wheel, guide wheels are disposed at the frame for guiding the lower travel portion of the crawler and the lateral outer portions of these guide wheels are covered by an earth and sand protect cover.

In order to prevent earth and sand from flowing into the crawler guide wheels, covers have been disposed at the lateral outer portions of the guide wheels. However, when earth and sand once flowed into the insides of these covers, such covers themselves have hindered the outflow of earth and sand, and such earth and sand have subsequently accumulated there in succession and intruded further into the driving wheels. On the other hand, earth and sand have entered the crawler links directly from the spaces between the covers and the driving wheels, and such earth and sand have further intruded into the driving wheels, thus causing the driving wheels to run onto the crawler links and the drive load to be increased.

SUMMARY OF THE INVENTION

It is an object of the present invention to overcome the defects of the prior art above-mentioned.

The crawler travelling apparatus according to the present invention is constructed such that a crawler having crawler links is windingly laid over the driving wheel and the take-up wheel, guide wheels for guiding the lower travel portion of the crawler are disposed at the frame, and the lateral outer portions of the guide wheels are covered by an earth and sand protection cover, and is characterized in that an earth and sand protection auxiliary cover is disposed at the frame between one end of the first-mentioned cover and the driving wheel and located at an inner position with respect to the first-mentioned cover, so as to form an earth and sand discharging opening together with the first-mentioned cover.

Additional provision of such auxiliary cover permits to cover entirely the lower travel portion of the crawler and to prevent earth and sand from flowing into the space between the first-mentioned cover and the driving wheel directly from the lateral side of the apparatus particularly when the apparatus is turningly travelled, simultaneously with forming an earth and sand discharging opening between the cover and the auxiliary cover, whereby earth and sand flowed into the inside of the first-mentioned cover may be discharged without causing accumulation of earth and sand there. As a whole, suitable provision of the auxiliary cover permits to solve various troubles above-mentioned caused by the intrusion of earth and sand into the apparatus.

Other objects and advantages of the present invention will be apparent from the following description.

BRIEF DESCRIPTION OF THE DRAWINGS

The present invention will be further described by way of example, with reference to the accompanying drawings, in which.

DETAILED DESCRIPTION OF THE PREFERRED EMBODIMENTS

Figure 1:
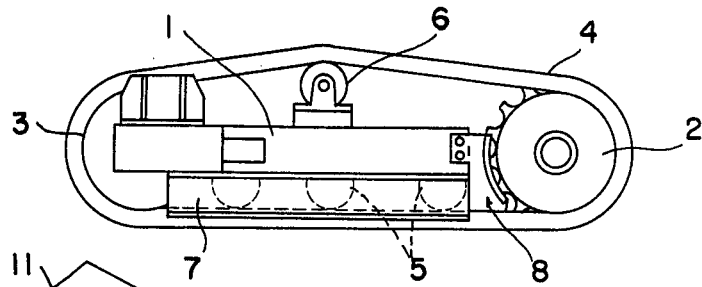
FIG. 1 is a general side view of a crawler travelling apparatus in accordance with the present invention.
Figure 2:
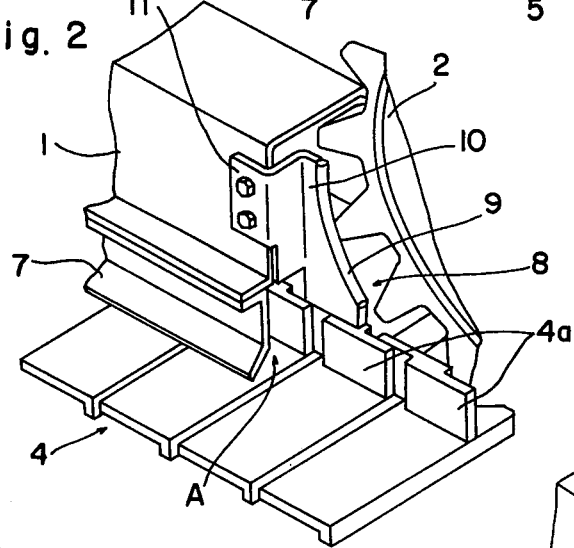
FIG. 2 is a detailed perspective view of an auxiliary cover used for the crawler travelling apparatus in FIG. 1.

FIG. 1 shows a crawler travelling apparatus to be attached to a back-hoe or a dowser. A driving wheel 2 and a take-up wheel 3 are disposed at both ends of a travelling frame 1, respectively, and a crawler 4 is windingly laid over these wheels 2 and 3. A plurality of guide wheels 5 for guiding the lower travel portion of the crawler 4 are disposed under the frame 1 and a wheel 6 for supporting the upper travel portion of the crawler 4 is disposed on the frame 1.

It is to be noted that such construction is provided at both lateral sides of the apparatus, although the description has been and will be made of only one lateral side thereof.

In order to prevent the inflow of earth and sand into that side of the crawler lower travel portion on which crawler links 4a are disposed, there are disposed a cover 7 for covering the lateral outer portions of the guide wheels 5 and an auxiliary cover 8 for covering the space between one end of the cover 7 and the driving wheel 2, these covers 7 and 8 being removable with respect to the frame 1.

The earth and sand protect cover 7 is provided with a C-shape member along the substantially entire length of the frame 1, the lower edge of the C-shape member being inclined downwardly and outwardly so as to come close to the upper surface of the lower travel portion of the crawler 4.

The auxiliary cover 8 is constructed such that a round bar 9 made of steel shaped so as to extend substantially along the outer diameter of the driving wheel 2 is attached to the edge of a portion 10 of the auxiliary cover 8 which is disposed along the vertical plane of the frame 1 and covers the space between the cover 7 and the driving wheel 2, and this portion 10 is attached to a L-shape portion 11 connected to the rear end of the frame 1 so that the lower edge of the portion 10 is located so as to come close to the upper edges of the crawler links 4a. Thus, the vertical plane portion 10 is located at an inner position with respect to the cover 7 and an opening A for discharging earth and sand is provided between the cover 7 and the auxiliary cover 8 when viewed in the crawler longitudinal direction.

The lateral side of the lower travel portion of the crawler 4 is thus entirely covered by the cover 7 and the auxiliary cover 8, thereby to prevent as much as possible the intrusion of earth and sand into the crawler guide wheels 5 and the crawler links 4a between the cover 8 and the driving wheel 2, while discharging the earth and sand which have entered into the inside of the cover 8, through the opening A.

It is to be noted that the round bar 9 of steel is attached for the purpose of reinforcing the vertical plane portion 10 and also for preventing abrasion thereof.

Figure 3:
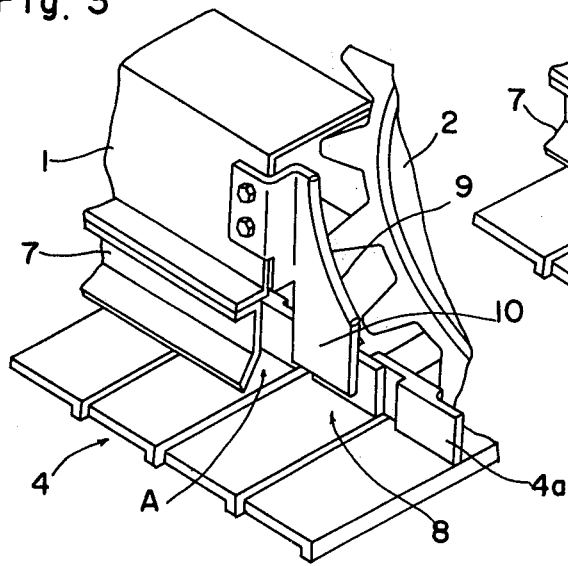
FIGS. 3 and 4 are also detailed perspective views of the auxiliary cover in other forms.

In FIG. 3 showing a first modification of the auxiliary cover 8, the vertical plane portion 10 is located outside with respesct to the crawler links 4a with the lower edge of the portion 10 coming closely to the upper surface of the lower travel portion of the crawler 4.

Figure 4:
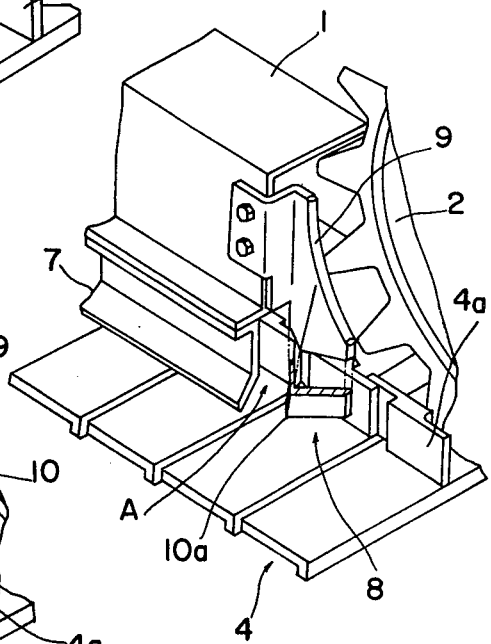

In FIG. 4 showing a second modification of the auxiliary cover 8, at least the lower portion 10a of the vertical plane portion 10 is outwardly projected in such a manner that the transverse center part of this portion 10a is projected most outwardly, whereby earth and sand flowed toward the crawler links 4a are positively guided outwardly. As far as the outermost portion of the projecting portion 10a is formed so as to provide the opening A together with the cover 7, the projecting portion 10a of the auxiliary cover 8 may be viewed as lapped over the cover 7 when taken from the crawler longitudinal direction.

We claim:

1. A crawler travelling apparatus comprising: a take-up wheel (3) and a drive wheel (2) disposed forwardly and rearwardly of a frame (1) respectively, a crawler (4) entrained about said two wheels (2) (3) and having a series of crawler links (4a) upstanding on an inner surface thereof, said two wheels (2) (3) being located inwardly with respect to said links (4a), guide wheels (5) disposed under said frame (1), adapted to guide a lower portion of said crawler (4), a main earth and sand fending cover (7) having a lower edge adjacent to an upper surface of the lower portion of said crawler (4), wherein: said main cover (7) provides an interval in side view between one end thereof and said drive wheel (2) to form an earth and sand discharge opening (A) with said crawler links (4a) at an inward side thereof, and an auxiliary earth and sand fending cover (8), said auxiliary cover is disposed between said one end of the main cover (7) and said drive wheel (2) and at an inward position with respect to said main cover (7) for covering said interval in side view, whereby earth and sand inadvertently entering said main cover (7) is caused to flow out of said opening (A) outwardly of said auxiliary cover without reaching said drive wheel (2) and said drive wheel (2) is positively protected by said auxiliary cover (8) from intrusion and accumulation of the earth and sand.

2. An apparatus as defined in claim 1 wherein: said auxiliary cover (8) is removably attached to a rear end of said frame (1).

3. An apparatus as defined in claim 2, wherein: said auxiliary cover (8) comprises an earth and sand fending portion having a vertical plane (10) and an L-shaped connecting portion (11) for connection to said frame (1).

4. An apparatus as defined in claim 3, wherein: said fending portion of said auxiliary cover (8) is located directly above said crawler links (4a) with a lower edge thereof lying adjacent to an upper surface of said crawler links (4a).

5. An apparatus as defined in claim 3, wherein: said fending portion of said auxiliary cover (8) is located outwardly of said crawler links (4a) with a lower edge thereof extending close to an upper surface of the lower portion of said crawler (4).

6. An apparatus as defined in claim 5, wherein: at least a lower portion (10a) of said fending portion projects outwardly in such a manner that a substantial center in width thereof, projects most outwardly.

7. An apparatus as defined in either claims 3, 4, 5, or 6, wherein: a round bar (9) made of steel is securely fixed to and along a side edge of said fending portion of said auxiliary cover (8), said bar (9) being shaped so as to extend substantially along an outer periphery of said drive wheel (2).

* * * * *